(12) United States Patent
Millington et al.

(10) Patent No.: US 8,326,951 B1
(45) Date of Patent: Dec. 4, 2012

(54) ESTABLISHING A SECURE WIRELESS NETWORK WITH MINIMUM HUMAN INTERVENTION

(75) Inventors: Nicholas A. J. Millington, Santa Barbara, CA (US); Paul V. Hainsworth, Foxboro, MA (US)

(73) Assignee: Sonos, Inc., Santa Barbara, CA (US)

( * ) Notice: Subject to any disclaimer, the term of this patent is extended or adjusted under 35 U.S.C. 154(b) by 1224 days.

(21) Appl. No.: 11/147,116

(22) Filed: Jun. 6, 2005

(51) Int. Cl.
*G06F 15/177* (2006.01)
(52) U.S. Cl. .................. 709/220; 709/231; 370/254
(58) Field of Classification Search .................. 709/220; 370/254
See application file for complete search history.

(56) References Cited

U.S. PATENT DOCUMENTS

| | | | |
|---|---|---|---|
| 6,349,352 B1* | 2/2002 | Lea ................................. | 710/72 |
| 7,263,070 B1* | 8/2007 | Delker et al. ................. | 370/254 |
| 7,433,324 B2* | 10/2008 | Switzer et al. ................ | 370/254 |
| 7,469,139 B2* | 12/2008 | van de Groenendaal ..... | 455/411 |
| 2002/0124097 A1* | 9/2002 | Isely et al. .................... | 709/231 |
| 2004/0168081 A1* | 8/2004 | Ladas et al. ................... | 713/201 |
| 2005/0239445 A1* | 10/2005 | Karaoguz et al. .......... | 455/414.1 |
| 2006/0142034 A1* | 6/2006 | Wentink et al. ............... | 455/515 |
| 2006/0173976 A1* | 8/2006 | Vincent et al. ................ | 709/220 |
| 2007/0022207 A1* | 1/2007 | Millington .................... | 709/231 |

* cited by examiner

*Primary Examiner* — John Follansbee
*Assistant Examiner* — Glenford Madamba
(74) *Attorney, Agent, or Firm* — Hanley, Flight & Zimmerman, LLC

(57) ABSTRACT

Techniques for automatically configuring necessary parameters of a device to be coupled to a network with minimum human intervention are disclosed. In one embodiment, a wired and/or wireless Ad-hoc network is established to facilitate communications among a group of devices. When a new device is added to the network, a rudimentary communication path is initially established between one of the devices in the network and the new device such that necessary parameters (e.g., SSID, WEP security, channel frequency) can be exchanged for the new device to function properly in the network. To ensure the parameters are exchanged in a secure fashion, an additional public security procedure can be used between the two devices.

37 Claims, 9 Drawing Sheets

ESTABLISHING A SECURE WIRELESS NETWORK WITH MINIMUM HUMAN INTERVENTION

CROSS-REFERENCE TO RELATED APPLICATION

This application claims the benefits of the provisional application, No. 60/577,284, entitled "System and Method for establishing a secure wireless network with a minimum of human interaction and technical ability", filed Jun. 5, 2004, which is hereby incorporated by reference for all purposes.

BACKGROUND OF THE INVENTION

1. Field of the Invention

The invention is generally related to the area of multimedia technologies in consumer electronics industry. More particularly, the invention is related to techniques for connecting various devices to a network for secure communications with a minimum of human interaction and technical ability.

2. The Background of Related Art

Consumer electronics devices that operate using wireless or wired Ethernet standards are often subject to the same complicated set-up process as a wireless computer network. Typically, the person who sets up the wireless network must have at least some knowledge about IP (Internet Protocol) networking and Ethernet (e.g., 802.3, 802.11), such as addressing, security, broadcast, unicast, etc. Such a skill requirement is generally acceptable for computer-to-computer networks, which is typically done by an IT professional. However, it is impractical to require average consumers to have such knowledge to hook up consumer electronic devices, such as home entertainment products that use wireless/wired Ethernet connectivity.

FIG. 5 shows an exemplary setting 500 for connecting a computer to a wireless network. The setting 500 is typically displayed when a user is ready to connect the computer to a wireless network so that the user can enter relevant information in the setting 500. Although the setting 500 requires very little information to make the computer connected to the network, the information is relatively technical to the average consumers. First, the user has to know what type of network the computer is going to be connected to. There are two choices 502, Access Point (infrastructure) and Computer-to-computer (Ad Hoc). The distinction between these two types of network is a common knowledge to the IT professionals yet can be a difficult question to the average consumers. Further even if the user knows the difference, there are more questions or options related to the security settings in 504, which evidently requires some good understanding about the network security over the wireless network.

For home entertainment products, there is a clear need to create simple methods of setting up and maintaining a secure wireless/wired in-home network with minimum human interventions.

SUMMARY OF THE INVENTION

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

In general, the present invention pertains to techniques for automatically configuring necessary parameters of a device to be coupled to a network. According to one aspect of the present invention, an Ad-hoc (wireless or wired) network is established to facilitate communications among a group of devices. When a new device is added to the network, a rudimentary communication path is initially established between one of the devices in the network ("first device") and the new device ("second device") such that necessary parameters (e.g., SSID, WEP security, channel frequency) can be exchanged for the second device to function properly in the network. To ensure the parameters are exchanged in a secure fashion, an additional public security procedure can be used between the two devices.

According to another aspect of the present invention, a first device that may be or may not be the device in the network broadcasts a message including probing datagrams in compliance with the standard IP broadcast. The rudimentary communication path may be established after the second device responds to the message from the first device. According to yet another aspect of the present invention, such an automatic configuration process is only started when a user is indeed ready to do so. In general, a mechanism is provided and accessible by the user to activate the process. As such, no incident or unwanted configuration process could be initiated without the approval of the user. In one embodiment, the second device is equipped with two buttons that must be pressed simultaneously to activate the automatic configuration process.

The necessary parameters in the second device are subsequently configured in several exchanges of messages with the first device. At least some of the messages are encrypted. As a result, the second device is automatically configured to operate correctly in the network with a minimum of human intervention and technical ability. In an exemplary application of the present invention for an audio system with a controller and multiple zone players, an Ad-hoc network is formed among the controller and the zone players, where the network may be wired or wireless or a mixture of both. In one case, either a handheld controller or a zone player (referred to as an access device) is coupled to an access point of a LAN. An Ad-hoc network can be thus formed based on the access device. The remaining (unconfigured) zone players may be coupled to the network whenever desired, all with minimum human intervention. As a result, any one of the zone players may communicate with each other to share or distribute audio sources available on the Internet and reproduce sounds together or separately.

The present invention may be implemented in many forms including software, hardware or a combination of both as method, process, or system. According to one embodiment of the present invention, the present invention is a method for providing a first device and a second device for the network, activating the second device intentionally to automatically configure necessary parameters with the first device, establishing automatically a rudimentary communication path between the first device and the second device by scanning all available transmission channels allocated in accordance with a protocol; and exchanging messages between the first device and the second device over the rudimentary communication path till the second device is fully operating with the first device.

According to another embodiment of the present invention, the present invention is a system for establishing a network for a group of devices, the system comprises at least one of the devices provided to remotely control operations of one or more of the other devices, one of the devices (hereinafter "first device") configured to establish automatically respective rudimentary communication paths for probing communication, each of the rudimentary communication paths being with one of the other devices, wherein an automatic configuration process takes place only in one of the other devices after the user authorizes the one of the other devices to start the automatic configuration process, and wherein the automatic configuration process causes several messages to be exchanged between the first device and one of the other devices, some of the messages carry information pertaining to an appropriate transmission channel, an identifier of the network and a security key for subsequent communication, the some of the messages are encrypted.

According to yet another embodiment of the present invention, the present invention is a system for establishing a network for a group of devices, the system comprises a plurality of zone players, each equipped with a mechanism that is once manually activated by a user, an automatic configuration process starts, wherein one of the zone players is coupled to a local area network as an access device; and at least a controller provided to remotely control operations of one or more of the zone players, wherein the access device establishes automatically respective rudimentary communication paths, each with the controller or one of the remaining zone players, the automatic configuration process takes places in the controller and each of the remaining zone players after the user manually activates the automatic configuration process respectively in the controller and each of the remaining zone players, and wherein the automatic configuration process causes several messages to be exchanged between the access device and any one of the controller and the remaining zone players that have been activated for the automatic configuration process, some of the messages carry information pertaining to a transmission channel, an identifier of the network and a security key for subsequent communication, at least some of the messages are encrypted.

According to still another embodiment of the present invention, the present invention is a software product to be executable in a device for establishing a network for a group of devices, the software product comprises program code for activating a second device, when requested, to automatically configure necessary parameters with a first device, program code for establishing automatically a rudimentary communication path with the first device by scanning all available transmission channels allocated in accordance with a protocol, and program code for exchanging messages between the first device and the second device over the rudimentary communication path till the second device is fully operating with the first device.

According to still another embodiment of the present invention, the present invention is a method for establishing a network for a group of devices, the method comprises providing a plurality of zone players, each equipped with a mechanism that once is manually activated by a user, an automatic configuration process starts, wherein at least a controller is provided to remotely control operations of one or more of the zone players; coupling one of the zone players to a local area network as an access device; establishing automatically respective rudimentary communication paths with the access device, each of paths being with the controller or one of the remaining zone players, wherein the automatic configuration process takes place in the controller and each of the remaining zone players after the user manually activates the automatic configuration process respectively in the controller and each of the remaining zone players, and exchanging several messages between the access device and any one of the controller and the remaining zone players that have been activated for the automatic configuration process, wherein some of the messages carry information pertaining to a transmission channel, an identifier of the network and a security key for subsequent communication, and at least some of the messages are encrypted.

One of the objects, features, and advantages of the present invention is to provide techniques that facilitate automatic configuration of devices to be coupled to a network with minimum human intervention.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PREFERRED EMBODIMENTS

The present invention pertains to techniques for automatically configuring necessary parameters of a device to be coupled to a network with minimum human intervention. According to one aspect of the present invention, a wired and/or wireless Ad-hoc network is established to facilitate communications among a group of devices. According to one aspect of the present invention, when a new device is added to the network, a rudimentary communication path is initially established between one of the devices ("first device") in the network and the new device ("second device") such that necessary parameters (e.g., SSID, WEP security, channel frequency) can be exchanged for the new device to function properly in the network. To ensure the parameters are exchanged in a secure fashion, an additional public security procedure can be used between the two devices.

The detailed description of the present invention is presented largely in terms of procedures, steps, logic blocks, processing, or other symbolic representations that directly or indirectly resemble the operations of devices or systems that can be used on networks. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams or the use of sequence numbers representing one or more embodiments of the invention do not inherently indicate any particular order nor imply any limitations in the invention.

Embodiments of the invention are discussed herein with reference to an audio system with multi-zone capability. However, those skilled in the art will readily appreciate that the detailed description given herein with respect to the audio system is for explanatory purposes as the invention extends beyond these limited embodiments.

Figure 1:
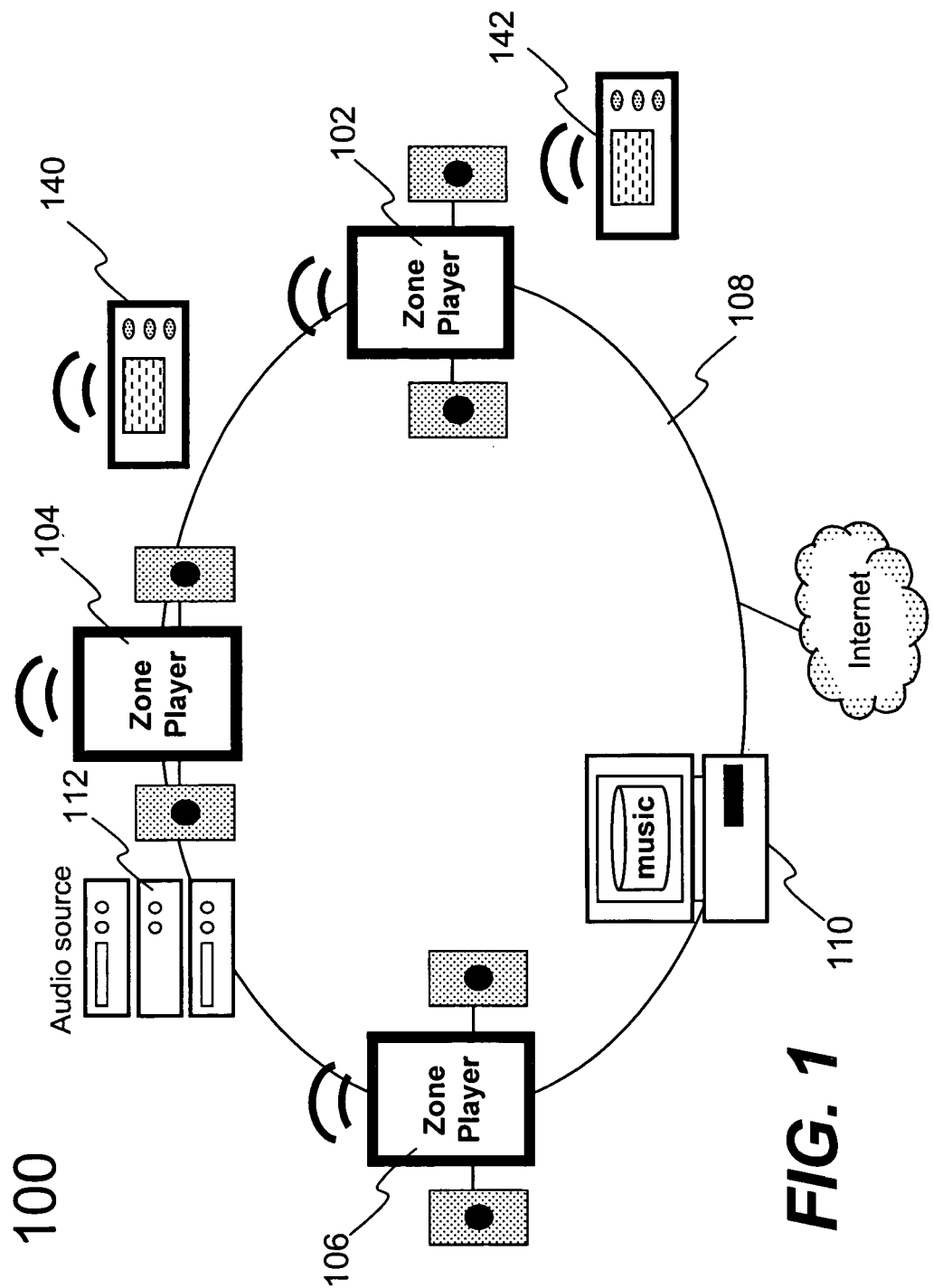
FIG. 1 shows an exemplary configuration in which the present invention may be practiced.

Referring now to the drawings, in which like numerals refer to like parts throughout the several views. FIG. 1 shows an exemplary configuration 100 in which the present invention may be practiced. The configuration may represent, but not be limited to, a part of a residential home, a business building or a living complex with multiple zones. There are a number of multimedia players of which three examples 102, 104 and 106 are shown as audio devices. Each of the audio devices may be installed or provided in one particular area or zone and hence referred to as a zone player herein.

As used herein, unless explicitly stated otherwise, a track and an audio source are used interchangeably, an audio source or audio sources are in digital format and can be transported or streamed across a data network. To facilitate the understanding of the present invention, it is assumed that the configuration 100 represents a home. Thus, the zone player 102 and 104 may be located in two of the bedrooms respectively while the zone player 106 may be installed in a living room. All of the zone players 102, 104 and 106 are coupled directly or indirectly to a data network 108. In addition, a computing device 110 is shown to be coupled on the network 108. In reality, any other devices such as a home gateway device, a storage device, or an MP3 player may be coupled to the network 108 as well.

The network 108 may be a wired network, a wireless network or a combination of both. In one example, all devices including the zone players 102, 104 and 106 are coupled to the network 108 by wireless means based on an industry standard such as IEEE 802.11. In yet another example, all devices including the zone players 102, 104 and 106 are part of a local area network that communicates with a wide area network (e.g., the Internet).

All devices on the network 108 may be configured to download and store audio sources or receive streaming audio sources. For example, the computing device 110 can download audio sources from the Internet and store the downloaded sources locally for sharing with other devices on the Internet or the network 108. The zone player 106 can be configured to receive streaming audio source and share the source with other devices. Shown as a stereo system, the device 112 is configured to receive an analog source (e.g., from broadcasting) or retrieve a digital source (e.g., from a compact disk). The analog sources can be converted to digital sources. In accordance with the present invention, all audio sources, regardless of where they are located or how they are received, may be shared among the devices on the network 108.

Any device on the network 108 may be configured to control operations of the zone players 102, 104 and 106. In particular, one or more controlling devices 140 and 142 are used to control zone players 102, 104 and 106 as shown in FIG. 1. The controlling devices 140 and 142 are preferably portable and remotely control the zone players via wireless means (e.g., infrared, radio, wireless standard IEEE 802.11b or 802.11g). In one embodiment, besides controlling an individual zone player, the controlling device 140 or 142 is configured to manage audio sources and other characteristics of all the zone players regardless where the controlling device 140 or 142 is located in a house or a confined living complex.

Figure 2A:
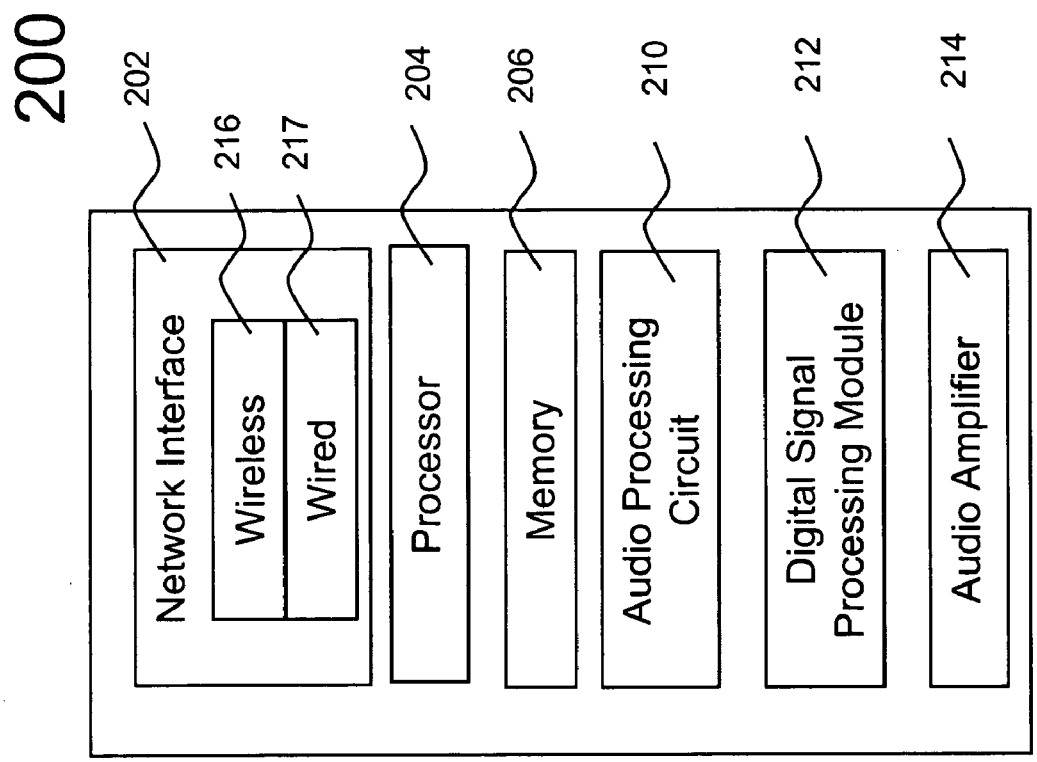
FIG. 2A shows an exemplary functional block diagram of a player in accordance with the present invention.

Referring now to FIG. 2A, there is shown an exemplary functional block diagram of a zone player 200 in accordance with the present invention. The zone player 200 includes a network interface 202, a processor 204, a memory 206, an audio processing circuit 210, a digital signal processing module 212, and an audio amplifier 214. The network interface 202 facilitates a data flow between a data network (i.e., the data network 108 of FIG. 1) and the zone player 200 and typically executes a special set of rules (i.e., a protocol) to send data back and forth. One of the common protocols is TCP/IP (Transmission Control Protocol/Internet Protocol) commonly used in the Internet. In general, a network interface manages the conversion of an audio source or file into smaller packets that are transmitted over the data network or reassembles received packets into the original source or file. In addition, the network interface 202 handles the address part of each packet so that it gets to the right destination or intercepts packets destined for the zone player 200.

The network interface 202 may include either one or both of a wireless interface 216 and a wired interface 217. The wireless interface 216, also referred to as a RF interface, provides network interface functions by a wireless means for the zone player 200 to communicate with other devices in accordance with a communication protocol (such as the wireless standard IEEE 802.11a, 802.11b or 802.11g). The wired interface 217 provides network interface functions by a wired means (e.g., an Ethernet cable). Depending on implementation, each of the zone players may be equipped with either one or both of the interfaces 216 or 217. In one embodiment, a zone player, referred to as an access zone player, including both of the interfaces 216 and 217 is coupled to an access point of an LAN and communicates with other zone players wirelessly. Thus these other zone players may communicate with other devices on a network or retrieve audio sources via the access zone player. The processor 204 is configured to control the operation of other parts in the zone player 200. The memory 206 may be loaded with one or more software modules that can be executed by the processor 204 to achieve desired tasks.

The audio processing circuit 210 resembles most of the circuitry in an audio playback device and includes one or more digital-to-analog converters (DAC), an audio preprocessing part, an audio enhancement part or a digital signal processor and others. In operation, when an audio source (e.g., audio source) is retrieved via the network interface 202, the audio source is processed in the audio processing circuit 210 to produce analog audio signals. The processed analog audio signals are then provided to the audio amplifier 214 for playback on speakers. In addition, the audio processing circuit 210 may include necessary circuitry to process analog signals as inputs to produce digital signals for sharing with other devices on a network.

Depending on an exact implementation, the digital signal processing module 212 may be implemented within the audio processing circuit 210 or as a combination of hardware and software. The audio amplifier 214 is typically an analog circuit that powers the provided analog audio signals to drive one or more speakers.

Figure 2B:
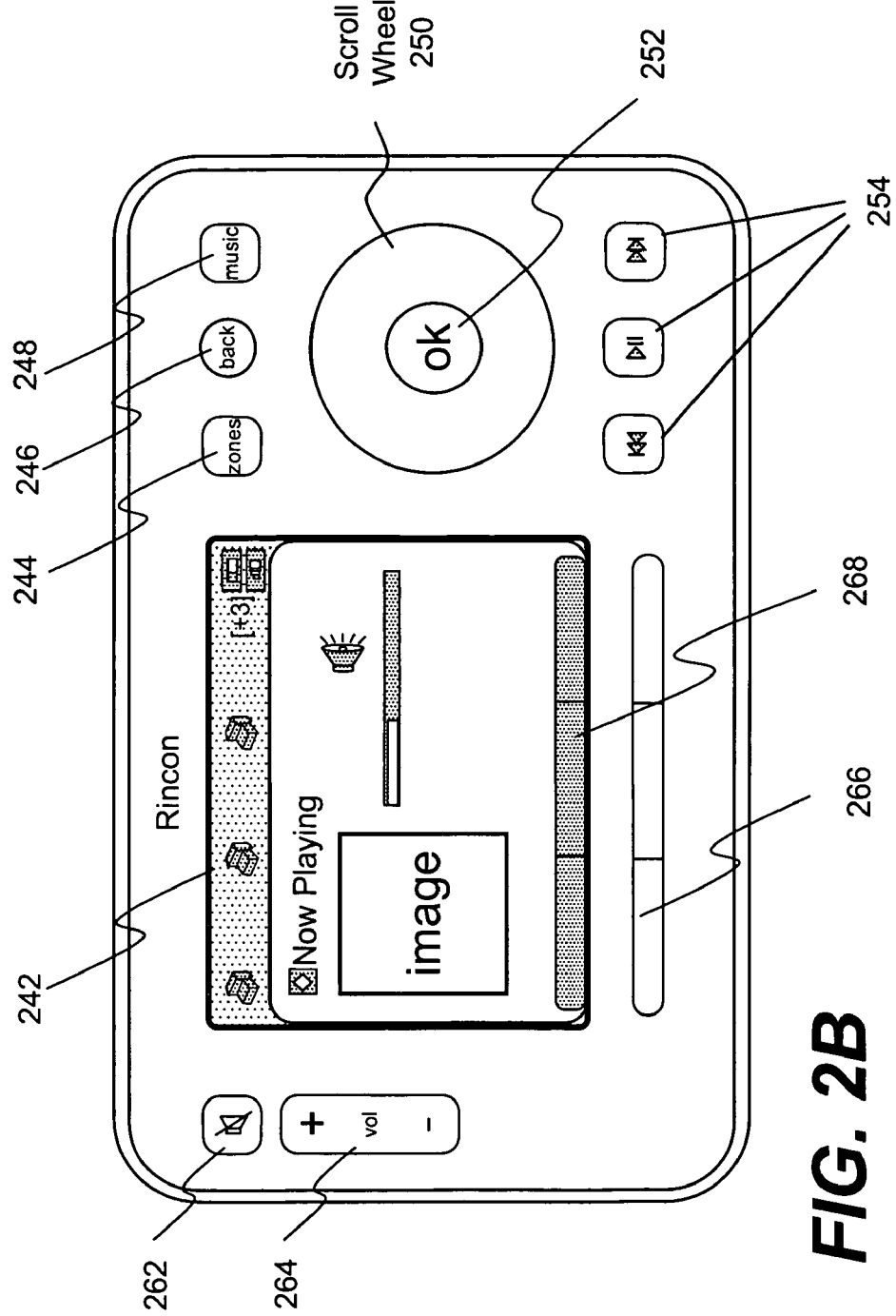
FIG. 2B shows an example of controllers that may be used to remotely control one of more players of FIG. 1.

Referring now to FIG. 2B, there is shown an example of a controller 240, which may correspond to the controlling device 140 or 142 of FIG. 1. The controller 240 may be used to facilitate the control of multi-media applications, automation and others in a living complex. In particular, the controller 240 is configured to facilitate a selection of a plurality of audio sources available on the network, controlling operations of one or more zone players (e.g., the zone player 200) through a RF interface corresponding to the wireless interface 216 of FIG. 2A. According to one embodiment, the wireless means is based on an industry standard (e.g., infrared, radio, wireless standard IEEE 802.11a, 802.11b or 802.11g). When a particular audio source is being played in the zone player 200, a picture, if there is one, associated with the audio source may be transmitted from the zone player 200 to the controller 240 for display. In one embodiment, the controller 240 is used to select an audio source for playback. In another embodiment, the controller 240 is used to manage (e.g., add, delete, move, save, or modify) a playlist.

The user interface for the controller 240 includes a screen 242 (e.g., a LCD screen) and a set of functional buttons as follows: a "zones" button 244, a "back" button 246, a "music" button 248, a scroll wheel 250, "ok" button 252, a set of transport control buttons 254, a mute button 262, a volume up/down button 264, a set of soft buttons 266 corresponding to the labels 268 displayed on the screen 242.

The screen 242 displays various screen menus in response to a selection by a user. In one embodiment, the "zones" button 244 activates a zone management screen or "Zone Menu" to allow a user to group players in a number of desired zones so that the players are synchronized to play an identical playlist or tracks. The "back" button 246 may lead to different actions depending on the current screen. In one embodiment, the "back" button triggers the current screen display to go back to a previous one. In another embodiment, the "back" button negates the user's erroneous selection. The "music" button 248 activates a music menu, which allows the selection of an audio source (e.g., a song track) to be added to a playlist (e.g., a music queue) for playback.

The scroll wheel 250 is used for selecting an item within a list, whenever a list is presented on the screen 242. When the items in the list are too many to be accommodated in one screen display, a scroll indicator such as a scroll bar or a scroll arrow is displayed beside the list. When the scroll indicator is displayed, a user may rotate the scroll wheel 250 to either choose a displayed item or display a hidden item in the list. The "ok" button 252 is use to confirm the user selection on the screen 242 or activate a playback of an item.

There are three transport buttons 254, which are used to control the effect of the currently playing track. For example, the functions of the transport buttons may include play/pause and forward/rewind a track, move forward to the next track, or move backward to the previous track. According to one embodiment, pressing one of the volume control buttons such as the mute button 262 or the volume up/down button 264 activates a volume panel. In addition, there are three soft buttons 266 that can be activated in accordance with the labels 268 on the screen 242. It can be understood that, in a multi-zone system, there may be multiple audio sources being played respectively in more than one zone players. The music transport functions described herein shall apply selectively to one of the sources when a corresponding zone player is selected.

Figure 2C:
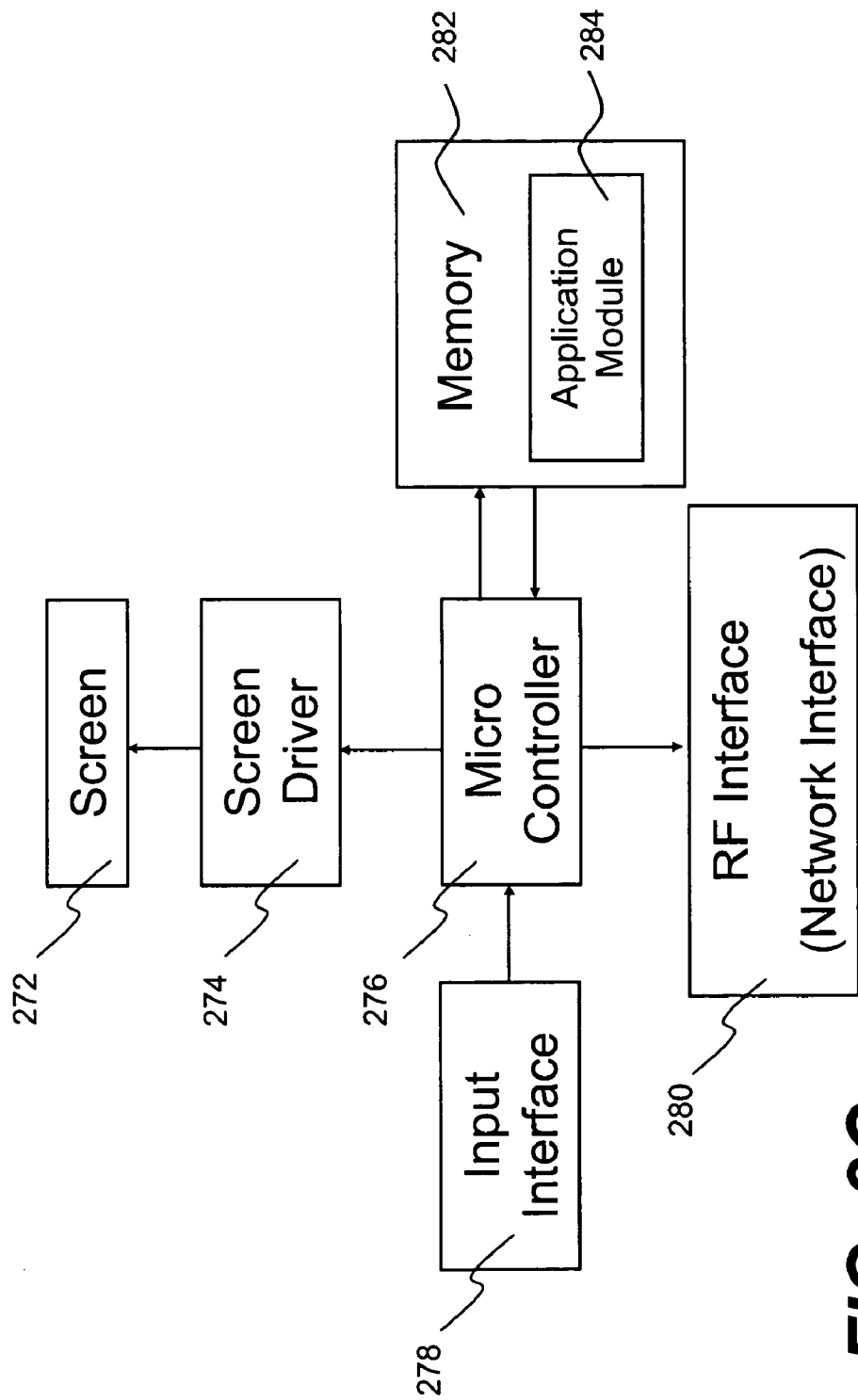
FIG. 2C shows an exemplary internal functional block diagram of a controller in accordance with one embodiment of the present invention.

FIG. 2C illustrates an internal functional block diagram of an exemplary controller 270, which may correspond to the controller 240 of FIG. 2B. The screen 272 on the controller 270 may be a LCD screen. The screen 272 communicates with and is commanded by a screen driver 274 that is controlled by a microcontroller (e.g., a processor) 276. The memory 282 may be loaded with one or more application modules 284 that can be executed by the microcontroller 276 with or without a user input via the user interface 278 to achieve desired tasks. In one embodiment, an application module is configured to facilitate automatic establishment of a wireless connection with a network or another device. In another embodiment, an application module is configured to facilitate automatically configuring itself after communicating with another configured device. It should be noted that similar application modules may also be included in the memory 206 of FIG. 2A. As a result, either a zone player or a controller may be automatically configured to communicate over a network, provided such an automatic configuration is intended by a user.

The controller 270 includes a network interface 280 referred to as a RF interface 280 that facilitates wireless communication with a zone player via a corresponding wireless interface or RF interface thereof. The controller 270 may control one or more zone players, such as 102, 104 and 106 of FIG. 1. Nevertheless, there may be more than one controllers, each preferably in a zone (e.g., a room) and configured to control any one and all of the zone players.

It should be pointed out that the controller 240 in FIG. 2B is not the only controlling device that may practice the present invention. Other devices that provide the equivalent control functions (e.g., a computing device, a PDA, a hand-held device, and a laptop computer) may also be configured to practice the present invention. In the above description, unless otherwise specifically described, it is clear that keys or buttons are generally referred to as either the physical buttons or soft buttons, enabling a user to enter a command or data.

Figure 3A:
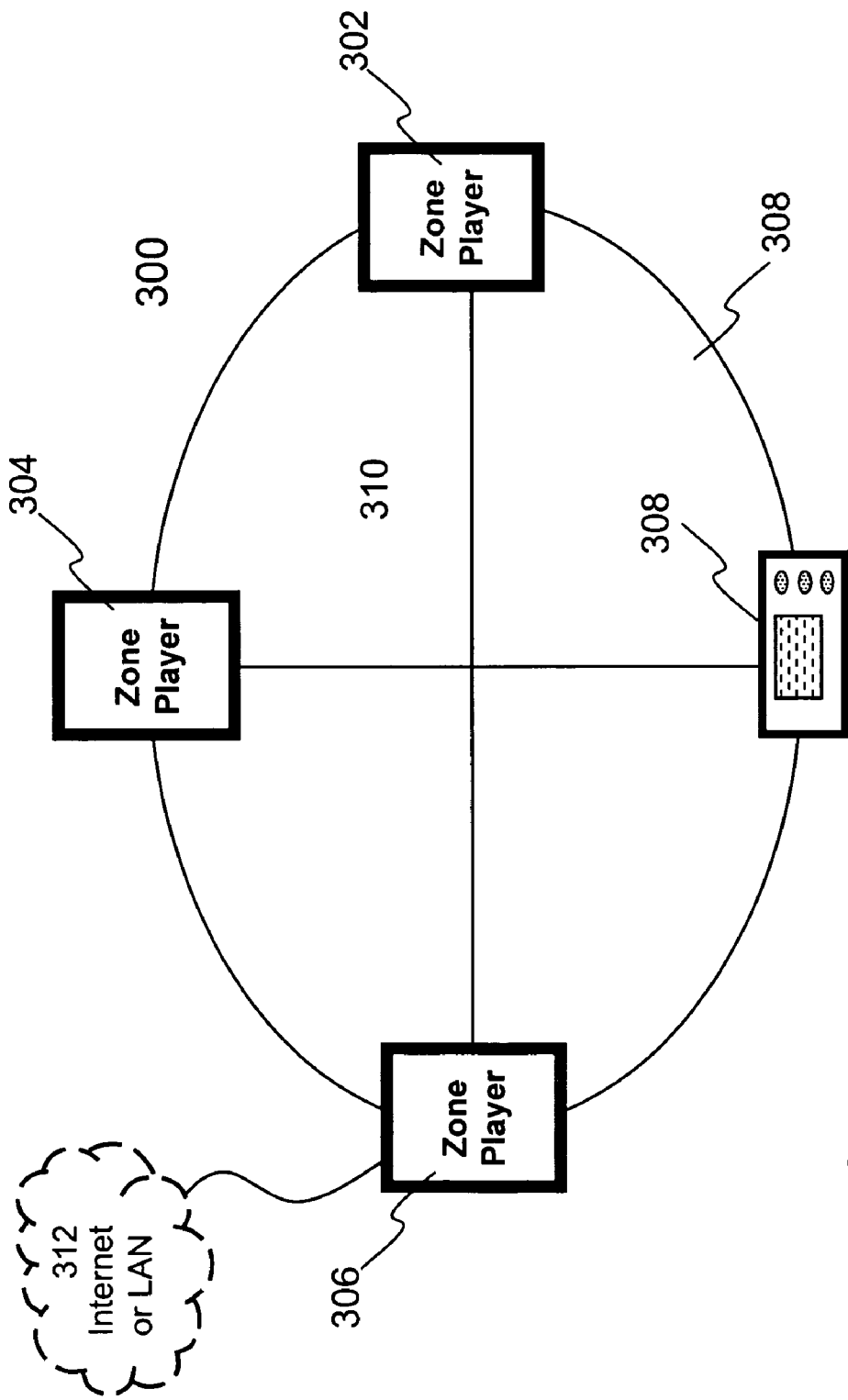
FIG. 3A shows three zone players and a controller that form an Ad-Hoc network as an example to facilitate the description of an automatic configuration process contemplated in the present invention.

It is assumed that a user has obtained an audio system that includes a set of zone players and a controller. Although it is possible to connect each of the zone players and the controller to a network, the requirement for extra network cards, cables and a hub/switch/router makes the idea unattractive. The introduction of wireless networking has allowed for an implementation without these requirements. FIG. 3A shows that there are three zone players 302, 304 and 306 and a controller 308 that form a network branch that is also referred to as an Ad-Hoc network 310. In one embodiment, the network 310 is pure wireless. In another embodiment, the network 310 is wired or a combination of wired and wireless. In general, an Ad-Hoc (or "spontaneous") network is a local area network or other small network in which there is no one access point for all traffics. With an established Ad-Hoc network, the devices 302, 304, 306 and 308 can all communicate with each other in 'peer-to-peer' style of communication. Furthermore, any device may come/go from the network and the network will automatically reconfigure itself without needing the user to reconfigure the network.

By the Ad-Hoc network 310, the devices 302, 304, 306 and 308 may share or exchange one or more audio sources and be grouped to play identical or different audio sources. For example, the devices 302 and 304 are grouped to play back one piece of music, and at the same time, the device 306 plays back another piece of music. In other words, the devices 302, 304, 306 and 308 as shown in FIG. 3A form a HOUSEHOLD that distribute audio and/or reproduce sound. As used herein, the term HOUSEHOLD (always in caps to disambiguate from the user's domicile) is used to represent a collection of networked devices that are cooperating to provide an application or service. An instance of a HOUSEHOLD is identified with a Household ID (or HHID).

In one embodiment, an HHID is a short string or an identifier that is computer-generated to ensure that it is unique. Accordingly, the network 310 may be characterized by a unique HHID and a unique set of configuration variables or parameters, such as Channels (i.e., respective frequency bands), SSID (a sequence of alphanumeric characters as a name of a wireless network), and WEP keys (wired equivalent privacy, or simply security keys). In one embodiment, SSID is simply set to be the same as HHID. One of the aspects of the present invention is to provide a bootstrap procedure that enables automatic and simple establishment of these configuration parameters in each device within a HOUSEHOLD to enable communications among the devices.

In general, each HOUSEHOLD includes two types of network nodes:

Control Point (CP)—it controls the overall network setup process and sequencing, including an automatic generation of required network parameters (e.g., WEP keys). In one embodiment, it also provides the user with a HOUSEHOLD configuration user interface. The CP function is typically provided by a computer running a CP application module, or by a handheld controller (e.g., the controller 308) also running CP application module.

Zone Player (ZP)—the ZP is any other device on the network that is placed to participate in the automatic configuration process. It should be noted that ZP, as a notation used herein, includes the controller 308 or a computing device.

The configuration of a HOUSEHOLD involves multiple CP's and ZP's that rendezvous and establish a known configuration such that they can use standard networking protocol (e.g., IP over Wired or Wireless Ethernet) for communication. In one embodiment, there are two types of networks/protocols: Ethernet—802.3 and Wireless—802.11g. Interconnections between a CP and a ZP may use either one of the networks/protocols. A device in the system as a member of a HOUSEHOLD may connect to both networks simultaneously. In an environment that has both networks in use, it is assumed that at least one device in a system is connected to both as a bridging device, thus providing bridging services between wired/wireless networks for others. The zone player 306 in FIG. 3A is shown to be connected to both networks, for example, the connectivity to the network 312 is based on Ethernet while the connectivity to other devices 302, 304 and 308 is based on Wireless.

Establishing a Rudimentary Communication Path.

In reference to FIG. 3A, a zone player is not yet a member of a HOUSEHOLD. It is assumed that the zone player is to be added to become a member of the HOUSEHOLD by a cable or wireless. When the zone player is initially turned on, it executes an embedded module that is configured to establish a rudimentary communication path with another device (network-enabled). The rudimentary communication path facilitates the automatic configuration of the zone player via the another device. This communication path may operate over wireless and/or Ethernet protocols, as the zone player may be connected to one or both. In operation, the communication path does not cause negative effects on other devices in the vicinity and can reach all other members of the HOUSEHOLD (both CP's and ZP's) if there are any. It should also be noted that the communication path does not have to be direct between two devices and may be bridged by one or more other devices. Because the communication path is only used for initial device configuration, it does not require significant performance or sophisticated functionality. There are at least two elements to establish the communication path: channel selection and packet exchange.

Channel Selection.

The selection of an appropriate (RF) transmission channel or simply channel is primarily an exercise in two constraints: finding a channel that is quiet from a protocol (e.g., 802.11) viewpoint, i.e., minimal conflicting wireless traffic, and finding a channel that is quiet from an RF viewpoint, i.e., minimal noise from other signals. Both of these tests may be applied because typically a home environment may have other RF (e.g., 2.4 GHz) traffic or potentially other wireless access points. It is generally desirable to use a channel that is free from other RF interference. In any case, it is always desirable to avoid other wireless traffic.

Channel selection is typically accomplished with a scanning technique, namely the device listens on each channel for a period of time, looking for the presence of wireless beacons and other RF signals. In one embodiment, devices that are configured have a preferred channel for the HOUSEHOLD, devices that are not configured have a pre-defined (default) channel or channels that they rendezvous on. For example, 802.11b/g channel 1 could be pre-configured as the default channel. Alternatively, multiple channels, with a well-known frequency hopping sequence, could be used by the devices (this would require an aperiodic frequency change interval).

Many hardware configurations only support reception/transmission on a single channel at a given time. Also there are configured and unconfigured devices that may use different channels for the bootstrap configuration and standard network operations (post-configuration communications). According to one embodiment, it is necessary to forcibly put the devices in a "configuration" mode, whereby they use the appropriate channels for communication.

Packet Exchange.

To enable communication between devices that are not part of the same HOUSEHOLD, a packet exchange network infrastructure is developed. Probing messages are sent in such a way that they traverse both the Ethernet and wireless networks, reaching any connected devices. Devices that are already in a HOUSEHOLD constitute a network infrastructure that can be used to exchange unicast and multicast/broadcast network frames between the devices. A device that is not yet in the HOUSEHOLD has a much more limited networking capability and can only receive data from devices to which it is directly wired, and unencrypted messages broadcast to all wireless networks operating in a particular channel of the RF spectrum.

In general, an IP address of a new device is not known to any members of the HOUSEHOLD. If the device is purely wireless, it may not have an IP address at all, or it may have an automatically assigned IP address that is inaccessible to other devices with IP addresses respectively assigned by a DHCP server. To allow devices that are not members of the HOUSEHOLD to join the HOUSEHOLD, a transport may be constructed that can get data one "hop" beyond the HOUSEHOLD network infrastructure.

In one embodiment, packets of data are broadcasted among the members of the HOUSEHOLD. The packets of data comprise a mixture of "probe" datagrams and standard IP broadcast. For example, the 802.11 "probe" datagrams are used for the inherent ability to cross wireless network boundaries. In other words, the "probe" datagrams can be received by all listeners (i.e., other devices) on the channel, even those that are not configured with an SSID, because they are sent to the broadcast BSS (e.g., FF:FF:FF:FF:FF:FF) to which all devices may be configured to listen. A standard IP broadcast is used on the wired network segments and the HOUSEHOLD network infrastructure to enable a PC-based controller to participate while running with standard user privileges (which allow access only to IP-based network services). Used together as described below, the combination of the "probe" datagrams and IP broadcast provides for a broadcast datagram transport that allows even devices that have not had any networking parameters configured to communicate.

In general, the probe datagrams comprise a number of elements to facilitate the configuration of other devices to join the HOUSEHOLD. In one embodiment, each of the elements carries up to 255 bytes of data. An element contains data payload for each message used by the bootstrap procedure to invite others to join the HOUSEHOLD. This element is repeated as many times as necessary to carry the complete message. In one embodiment, the IP broadcast datagrams contain the same data payload as the normal IP data payload.

Messages relating to the bootstrap procedure may be forwarded beyond the boundaries of an existing HOUSEHOLD network infrastructure (including properly configured wireless devices, and the wired network). Similarly, messages originating outside of the HOUSEHOLD network infrastructure may be forwarded into the infrastructure. This forwarding procedure may be accomplished in a mixed wireless/wired network environment without introducing a broadcast storm. A broadcast storm is a state in which a message that has been broadcast across a network results in more responses than necessary, and each response results in even more responses in a snowball effect, subsequently resulting in a network meltdown. In one embodiment, the network is carefully configured to prevent such a broadcast storm or any illegal broadcast messages. To accomplish this, two flags are included in the message body, for example, "SENT_AS_PROBE" and "SENT_AS_IP_BROADCAST". When a device receives a "probe" message, assumed using "Sonos Netstart" SSID (or the broadcast BSS, as with all probe requests), it forwards the message as an IP broadcast message (after setting the "SENT_AS_IP_BROADCAST" flag) if the SENT_AS_IP_BROADCAST flag is not already set. Similarly, when it receives an IP broadcast with a UDP payload address to an appropriate port (e.g., port number 6969), it forwards the message as a "probe" datagram (after setting the "SENT_AS_PROBE" flag) if that flag is not already set. This allows messages related to the packet exchange both to enter and to exit the HOUSEHOLD network infrastructure without causing a broadcast storm.

Using this method of broadcast communication, packets can be sent between any member of the HOUSEHOLD and a device to join the HOUSEHOLD on both Ethernet and wireless networks. The device to join the HOUSEHOLD may be brand new and previously configured with a different network (e.g., a device with a stale configuration in a different household). In addition, if used sparingly, these broadcast messages do not interfere with the normal operation of the network or attached devices. As a result, a communication path on an agreed channel has been established between two devices.

Device Discovery.

To minimize impact on existing networks and to improve configuration security, the system requires a user to manually activate the auto-configuration process. This is accomplished by a specific action on each device that is being added to the network. For example, if the user is installing a brand new HOUSEHOLD, containing one CP and two ZP's, the activation process may be manually activated on each by, for example, powering off and on, pushing a reset button or pushing two or more specific buttons simultaneously. In one embodiment, the CP or ZP is simply powered up by the user, which activates the pre-installed module to start the bootstrap procedure.

For a ZP:
If the device is unconfigured (e.g., factory default settings), it will immediately go into a "sleep" mode where it is awaiting an activation command.
If the device has been previously configured, it will attempt to contact other members of its HOUSEHOLD network.

There are situations in which a ZP is orphaned, namely it is previously configured (e.g., perhaps, with another Ad-hoc network) and now is to be added to the HOUSEHOLD (e.g., the ZP is obtained from a previous owner). In the case of an orphan scenario, the ZP may patiently attempt to contact its original network. It can be perceived that this operation will be unsuccessful but otherwise harmless. Even in this configured state, the device can participate in the rudimentary broadcast communication processes described above.

For the CP:
If the device is unconfigured (e.g., factory default settings), it will present the user with a description of how to start the configuration process.
If the device is configured, it will attempt to contact other members of its HOUSEHOLD network.

The CP may also be an orphaned device, in which case it performs similarly to that of the ZP.

In both cases, correctly configured devices will establish network communications and make themselves available for normal operation. All devices, including those previously configured, will enter an "activation state" when the user indicates that this is desired. At this point, the configuration process can begin.

Device Configuration.

Figure 3B:
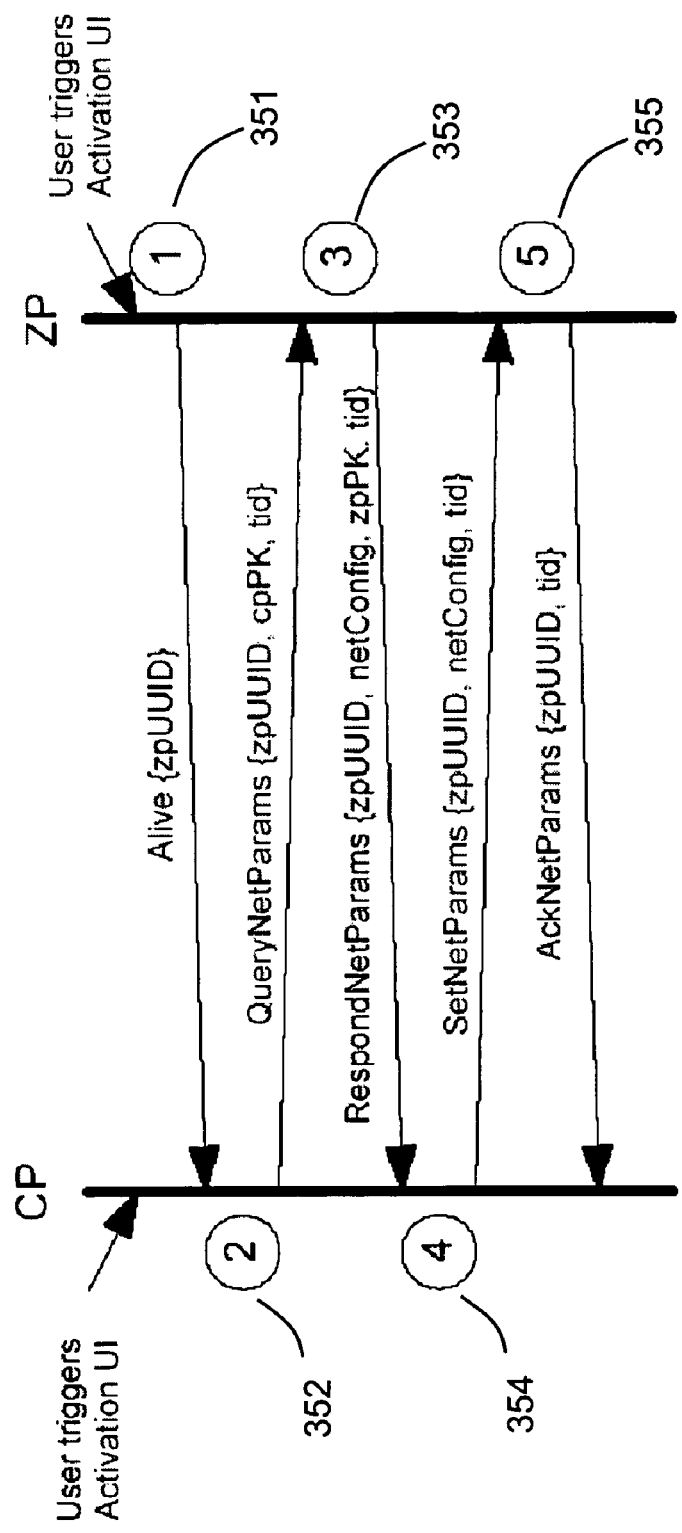
FIG. 3B shows an embodiment that involves a process of five exchanges of data.

The configuration is carried out by exchanging data between two devices that are not necessarily directly connected. This procedure is carried over a rudimentary communication path as described previously. The sequence of exchanging the data is initiated by the user or some other process, for example, activating a reset button, to trigger the "activation" or configuration mode on the involved devices. Each device executes this sequence, and then exits the activation mode. FIG. 3B shows an embodiment that involves a process of five exchanges of data.

Each of the data exchanges is referred to as a type of message: Alive, QueryNetParams, RespondNetParams, SetNetParams, and AckNetParams, each is explained as follows:

Alive—a message indicating that a named ZP is available for configuration. The message includes at least a zpUUID which is a globally unique identifier that identifies the ZP sending the message.

QueryNetParams—a request from the CP to the ZP to respond with the ZP's current network configuration information. The request includes at least a zpUUID, cpPK (the RSA public key of the CP) and tid (a unique transaction identifier).

RespondNetParams—a response to the QueryNetParams. It includes the ZP's network configuration information (HHID, WEP key and RSA public key). For security reasons, the WEP key is encrypted using the CP's public key that is only readable by the CP. The response includes at least a zpUUID, netConfig (the ZP's current network configuration parameters), zpPK, and tid. It is should be noted that a new ZP, set to factory defaults, shall have well-known parameter values, allowing the CP to determine that it is unconfigured.

SetNetParams—a command message from the CP to the ZP indicating that the ZP should reconfigure its network parameters. The WEP key is encrypted using the ZP's public key, and therefore only readable by the ZP. The command includes at least a zpUUID, netConfig and tid. It should be noted that netConfig includes the new configuration parameters for the ZP, as determined by the CP. The ZP should save this value in its network configuration, in some cases, these parameters may match the ZP's existing configuration.

AckNetParams—a response to the SetNetParams messaging. The response indicates that the SetNetParams message was received and that the network configuration contained therein has been successfully applied. The response includes at least a zpUUID and a tid.

In operation, after a user activates the configuration process (on both ZP and CP) at 351 in FIG. 3B. The CP enters a state where it is willing to accept an Alive message. The CP only remains in this state for a limited (finite) period of time. The ZP enters an activation state where it attempts rendezvous with a CP. The ZP only remains in this state for a limited (finite) period of time. The ZP will periodically transmit an Alive message until it either receives a QueryNetParams message, or exits the activation state.

At 352, the CP receives an Alive message. If the CP is in the configuration mode, it will generate a new tid, and send a QueryNetParams message and send to the ZP. It should be noted that the CP may or may not have been configured at this point. In either case, it sends the QueryNetParams. At 353, if it is already in the activation state, the ZP responds to a QueryNetParams with its current network configuration. If the ZP is unconfigured (e.g., factory default settings), it will return an empty HHID and WEP key. If the ZP is previously configured, it will return its current configuration. The ZP also returns its public key such that the WEP key can be encrypted using the CP's public key.

At 354, upon receiving the ZP's current configuration information, the CP decides on a course of action. Most, but not all, of these options result in a SetNetParams message being sent to the ZP. The matrix of possible situations:

|  | CP already configured | CP not configured |
| --- | --- | --- |
| ZP already configured | The CP sends a SetNetParams message to the ZP containing the CP's current net config. | The CP sets its own config to match the ZP config, and the config process is terminated. |
| ZP not configured | The CP sends a SetNetParams message to the ZP containing the CP's current net config. | The CP generates new config parameters. The parameters are sent to the ZP in a SetNetParams message. The CP sets its own config to these values as well. |

At 355, when the ZP receives a SetNetParams message, it reconfigures its own HHID and WEP key to match those contained in the network packet. Accordingly, the CP determines that it generates new configuration parameters in accordance with the following:

HHID—this is provided by the user via the CP user interface or automatically generated by the CP.
SSID—this is automatically generated by the CP (e.g., set to the same value as the HHID).
WEP Key—this is automatically generated (e.g., using a pseudo-random number generator, seeded with entropy collected by the CP).
Channel—the CP probes the network looking for an acceptable channel (based on a variety of criteria, which may include traffic and interference from other sources).

Subsequent to the activation process, any devices that have been reconfigured will attempt to establish normal network communications using their new network configuration parameters. In all of the above steps, if the CP or ZP is not already in the activation state, receipt of any messages is ignored.

If there are multiple ZP's activated simultaneously, all of the devices could execute this same sequence, independently of each other (the CP is capable of multiple independent sessions). If multiple CP's are activated, each will respond to a ZP's Alive message and will execute the sequence—the first one to deliver the SetNetParams to the ZP will configure it. It should be noted that in this case, the second CP will never get an AckNetParams message (because the ZP has exited the activate state). This will cause a transaction timeout in the second CP, at which point it will typically inform the user of the error, or retry the entire sequence. Should it retry the entire sequence, it will not reprogram the ZP (as described above that the effect of an unconfigured CP talking to a configured ZP).

Security.

To ensure that the communication among the members in a HOUSEHOLD by wireless means is secure, there are multiple issues in the auto-configuration that are resolved in the present invention.

1. Typically, the broadcasting messages in packet exchange are unencrypted. However, it is undesirable to transmit sensitive information such as WEP keys over wireless medium without encryption. As described below, public key cryptography is used to ensure that WEP keys are distributed in a secured manner.
2. Because the network configuration process is automated and the data is transmitted over the network, it is desirable to ensure that the process is not started without the approval of the user. Specifically, it must not be possible for a malicious wireless device to surreptitiously program one of the devices. Accordingly, the auto-configuration process is started manually by a user on all devices.
3. When one of the connected devices is removed from the HOUSEHOLD, it can no longer access to the network. This is accomplished with a mechanism on each device that resets it to factory default configuration (e.g., erases WEP keys and other private information).
4. It must be possible for the user to validate that they have correctly configured the right devices and that no other devices have been joined to the network. In one embodiment, this is accomplished with a validation/status user interface on the Control Point.

Use of Public Key Cryptography.

The configuration process uses public key cryptography to exchange WEP keys and other information which must not be visible to any party sniffing the network. In one embodiment, this is accomplished in the following manner:

1. There is a designated (e.g., Sonos) certificate authority (CA), an entity that can issue signed public key certificates.
2. Each CP and ZP is factory configured with a unique certificate, public and private key, in a format that supports the RSA algorithm. The certificate is signed and issued by the designated CA, and includes a hash of the MAC address of a device.
3. CP and ZP exchange public keys and WEP keys are encrypted using the public key. In certain circumstances, the devices compare the MAC in received packets with that in the certificate to add an additional layer of security.

Figure 4A:
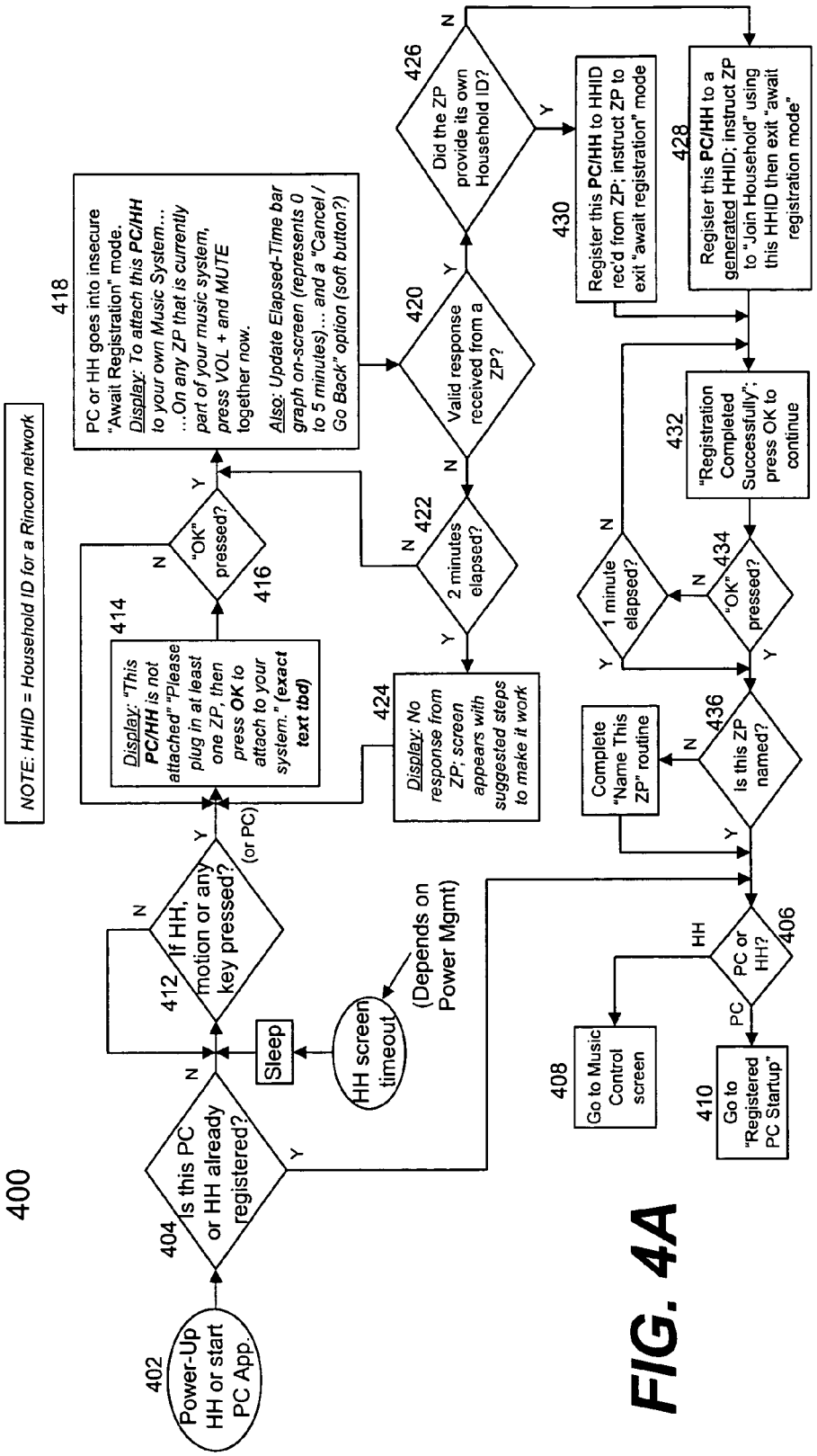
FIG. 4A shows a flowchart or process according to one embodiment of the present invention.

FIG. 4A shows a flowchart or process 400 according to one embodiment of the present invention. The process 400 may be implemented in hardware, software or a combination of both as a method, a system or a process. In one embodiment, the process 400 is implemented for a handheld controller or a computing device. To facilitate the understanding of the process 400, the description herein is based on a handheld controller, such as the controller 308 of FIG. 3A, which shall not be considered as the limitations to the present invention.

Typically, a handheld controller (or HH) is equipped with a mechanism to allow a user to reset itself. In some implementation, the reset is simply done when the controller is powered up. At 402, it is assumed that the controller is powered up. The process 400 goes to 404 to determine whether the controller is configured. By configuration, it means that the controller is ready for communication with other devices (e.g., zone players) that may or may not be on a network, preferably a wireless network. In the context of FIG. 3A, it means that the handheld device 308 is ready to communicate with each or all of the devices 302, 304, and 306 (assuming that the devices 302, 304, and 306 have not been configured yet).

It is assumed that the controller is configured, the process 400 goes to 406 where it determines whether the device is a controller or a computer. As described above, the device may be a controller, a personal computer or other type of device, although it has been assumed to be a controller. Nevertheless, in this embodiment, a step is provided to determine exactly what it is, because a controller and a computer may provide a different display or graphic environment. If the device is indeed a controller, the process 400 goes to 408, wherein the controller shows a proper screen for a user to proceed with the control of the zone players or replay of certain audios via one or more zone players. If the device is a computer, the computer is typically loaded with a module that is now executed to display an environment (e.g., a graphic user interface or GUI) that allows a user to perform many tasks that may be done on the handheld controller in addition to other tasks that may be assisted by a pointing device (e.g., a mouse) or a keyboard.

In any case, it is assumed that the device is a controller. Referring back to 404, it is now assumed that the device is not configured, the process 400 goes to 412 to determine if a user has activated the automatic configuration process. In one embodiment, the controller goes to "sleep" mode after a predefined time should there be no activation of the configuration process. When the user activates the configuration process, the process 400 goes 414 to determine whether the controller itself is coupled to an access point of a network, at least a member of the HOUSEHOLD (e.g., one zone player) is coupled thereto or an Ad-Hoc network. Typically, a GUI is provided for a handheld or a computer. Accordingly, a display with a relevant message is displayed. After it is certain that either the controller itself or a zone player is coupled to a network, a user may press "OK" in the displayed GUI.

At 418, should the user desire to start the automatic configuration process now, the user activates the process manually. In one embodiment, there are two buttons, labeled respectively as "VOL" and "Mute". When these two buttons are pressed at the same time, the automatic configuration process starts. The process 400 goes to 420 to determine whether a valid response is received from a zone player. If not, after a certain time 422, the process 400 goes back to 418 to reactivate the process or 414 via 424 to remind the user to ensure that the required connection is placed.

In one embodiment, a handheld controller is configured to facilitate a new zone player to execute a household join process to join the HOUSEHOLD upon an appropriate channel. The channel may be agreed upon between the controller and the zone player as follows:

1) when a reset or two buttons are pushed on the ZonePlayer to 'activate' the household join process, it starts a scan through the available wireless channels, sending the "Alive" datagram for each channel in turn. Sometimes, it cycles through the channels several times;
2) as soon as the ZonePlayer receives a QueryNetParams request address to itself, it stops the channel cycling; and
3) The ZonePlayer remains locked on whatever channel it has stopped cycling until a successful sequence ending in the configuration of the ZonePlayer (at which point it uses the specified channel), or a timeout expires (at which point it returns to its original channel or resumes cycling through channels and sending alive messages if the overall timeout for the activation process has not expired).

Although the Zone Player performs the channel cycling, the controller may also be configured to perform the channel cycling as well. However, when the controller is, for example, a personal computer, the Zone Player is typically configured to cycle through the available channels.

In any case, when a valid response is received from the zone player, the process 400 determines whether the zone player provides its own network name (e.g., HHID) at 426. If the zone player does not have an HHID, which means that the zone player is to be added into a wireless network named after an HHID provided by the device, the process 400 goes to 428 to instruct the zone player to join the wireless network. If the zone player does have an HHID, which means that the device itself is to be added into the wireless network named after the HHID provided by the zone player, the process 400 goes to 430 to exit.

The automatic configuration process, as described above, is executed. After it is completed, a message or an indication of completion is displayed. After the user acknowledges at 434, the user is offered to name the zone player, for example, "Dinning" which means that the zone player is in the dinning room. Subsequently, the process 400 goes to 406.

Figure 4B:
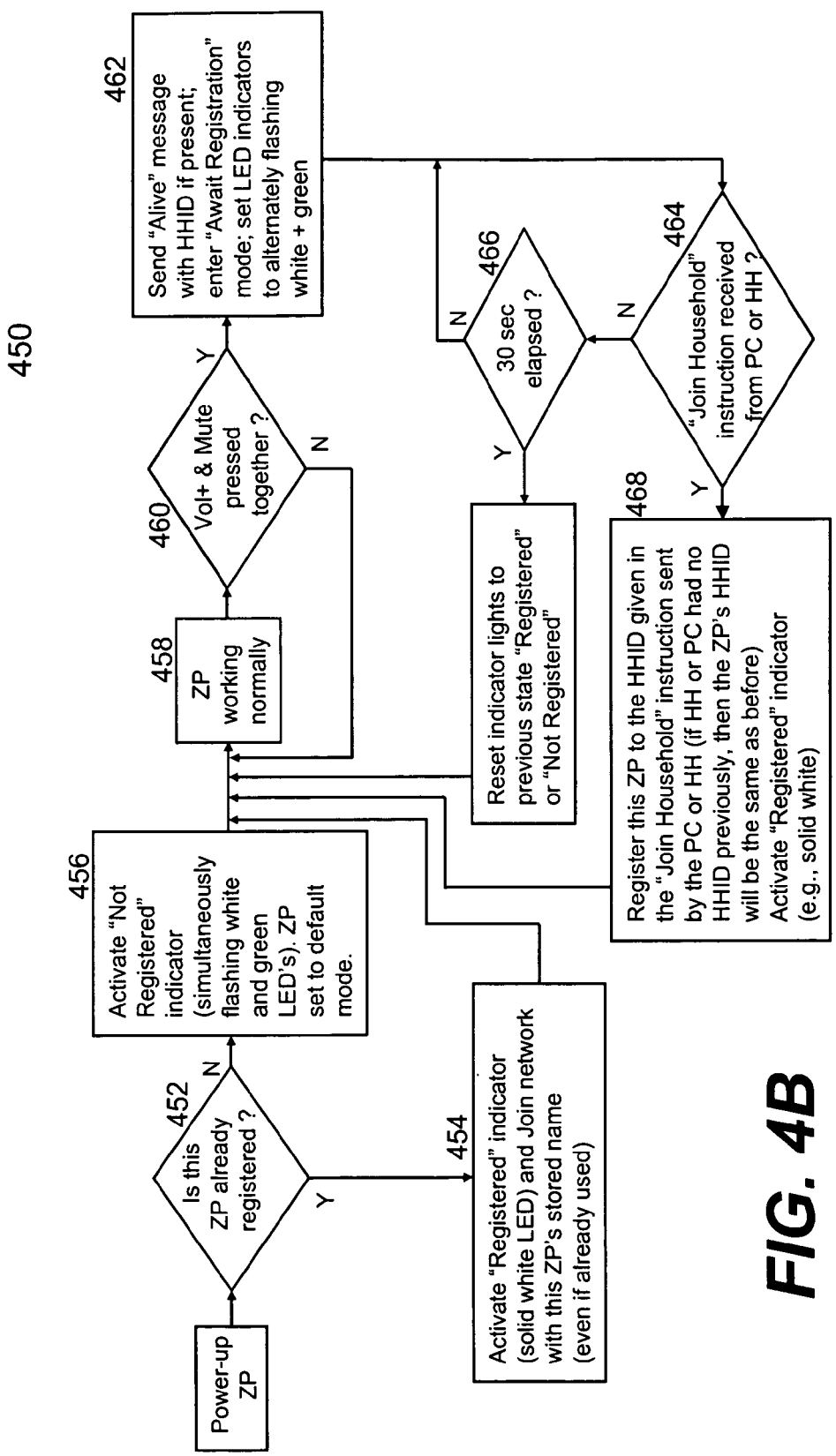
FIG. 4B shows another flowchart or process according to one embodiment of the present invention.
Figure 5:
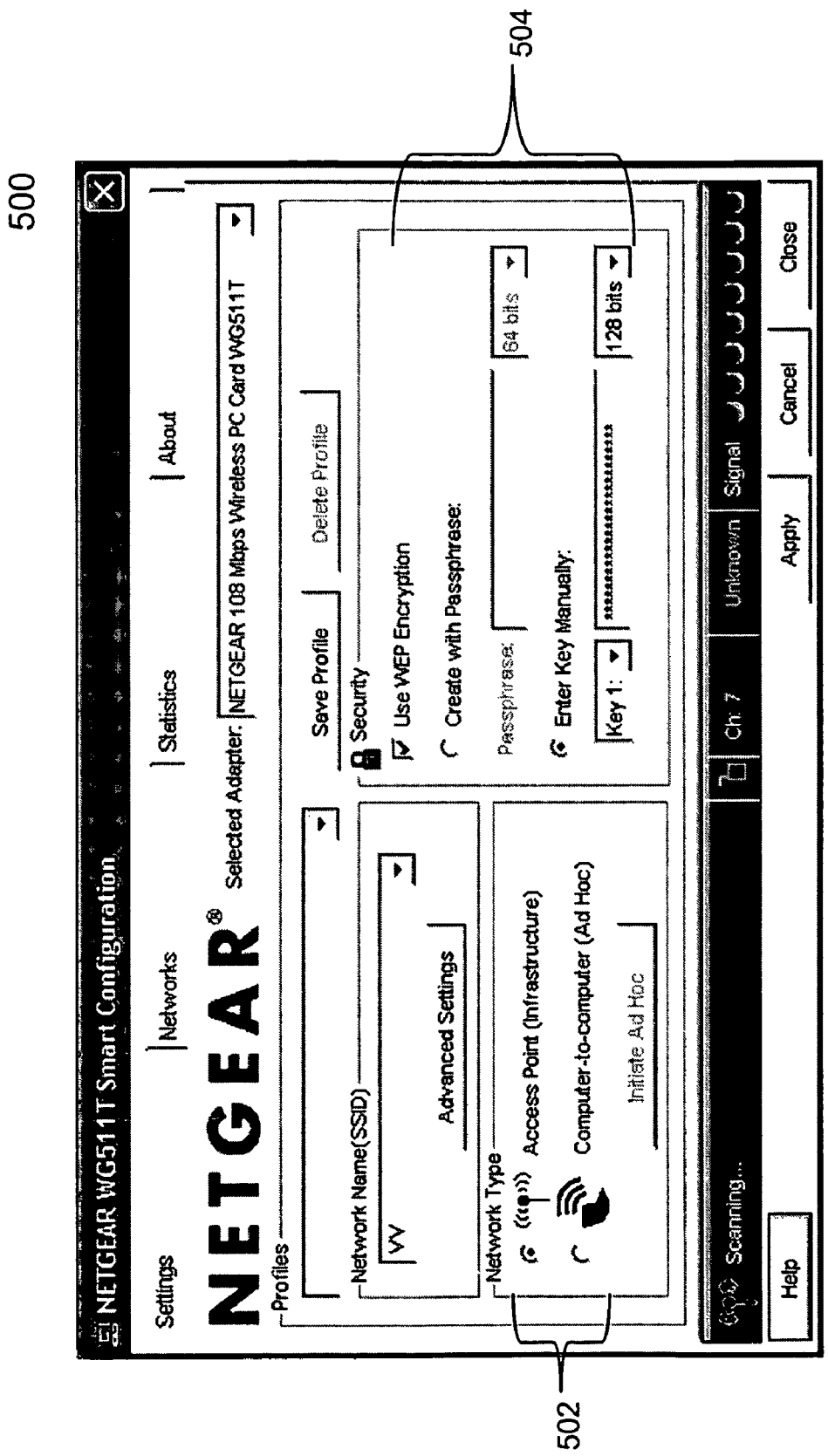
FIG. 5 shows an exemplary setting for connecting a computer to a wireless network.

For completeness, FIG. 4B shows a flowchart or process 450 that may be also implemented in hardware, software or a combination of both as a method, a system or a process. In one embodiment, the process 450 is implemented for a zone player. To facilitate the understanding of the process 450, the description herein is based on a zone player, such as the player 302 of FIG. 3A, which shall not be considered as the limitations to the present invention.

When a zone player is powered up, the process 450 determines whether the zone player is already registered or configured at 452. There are situations in which the zone player just obtained by a user is already configured, for example, the zone player is a used one (i.e., previously configured). If it is indeed configured, the process 450 goes to 454 where an indication of "registered" is shown. If the zone player is never configured, the process 450 goes to 456 to indicate such. It is assumed that the zone player works normally at 458 (e.g., through an internal checkup).

At 460, a user activates the automatic configuration process by, for example, pressing two buttons, labeled respectively as "VOL" and "Mute", at the same time. The automatic configuration process starts by sending out an Alive message at 462 as described above. At 464, the zone player awaits a response. If no response is received within or beyond a predefined time, the process 450 goes to 466 or 458 to continue waiting for a response or restart the process. It is assumed that there is a response, and the automatic configuration process continues as shown in FIG. 3B without failure, the process goes to 468 where the zone player is now part of the wireless network named after an HHID received either from a configured device or provided by itself.

There are numerous functions, benefits and advantages in the present invention. One of them is that the present invention provides techniques for automatically configuring parameters of a device to be coupled to an Ad-hoc network, where the Ad-hoc network forming by a group of devices can be wireless, wired or a combination of both. By way of the present invention, a system including a set of zone players and one or more controllers operates correctly and does not interfere with any existing network. Other functions, benefits and advantages can be appreciated from the detailed description provided above.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

What we claim:

1. A method of connecting a device to a secure network for one or more playback devices, the method comprising:
   receiving a manual user action at a zone player that is unconfigured for a secure network, wherein the manual user action initiates an automatic establishment of a connection to the secure network by the zone player;
   transmitting, by the zone player responsive to the manual user action, a first message over an unsecure network to be received by a device configured for the secure network, wherein the first message indicates that the zone player is available to join the secure network;
   receiving, over the unsecure network by the zone player, a second message from the device, wherein the second message is generated responsive to receipt of the first message and wherein the second message includes a security parameter to be used by the zone player to join the secure network; and
   establishing a connection to the secure network by the zone player using the security parameter without further input by any user via either the zone player or the device.

2. The method of claim 1, further comprising receiving audio content by the zone player over the secure network and playing back the audio content via the zone player.

3. The method of claim 1, wherein the security parameter is generated by the device.

4. The method of claim 1, wherein the security parameter comprises a wired equivalent privacy (WEP) key.

5. The method of claim 1, wherein the security parameter comprises a household identifier (HHID).

6. The method of claim 1, wherein the user command corresponds to a manual button press on the zone player.

7. The method of claim 1, wherein the device comprises a controller for the zone player.

8. The method of claim 1, wherein the device comprises a second zone player.

9. The method of claim 1, further comprising transmitting, via the zone player, audio content to another zone player.

10. The method of claim 1, wherein the device is triggered to hear the first message.

11. The method of claim 1, further comprising receiving, over the unsecure network by the zone player, a request from the device to the zone player to respond with the zone player's current network configuration information.

12. The method of claim 11, further comprising transmitting, over the unsecure network by the zone player, a response to the device by the zone player including the zone player's network configuration information.

13. The method of claim 1, wherein the second message comprises a command message from the device to the zone player to reconfigure the zone player's network configuration information.

14. The method of claim 13, further comprising transmitting, by the zone player, a third message including a response indicating that the zone player's network configuration information has been changed according to the command message from the device.

15. A non-transitory computer-readable storage medium including a set of instructions for execution by a processor, the set of instructions, when executed, facilitating connection of a device to a secure network via a method comprising:
   receiving a manual user action at a zone player that is unconfigured for a secure network, wherein the manual user action initiates an automatic establishment of a connection to the secure network by the zone player;
   transmitting, by the zone player responsive to the manual user action, a first message over an unsecure network to be received by a device configured for the secure network, wherein the first message indicates that the zone player is available to join the secure network;
   receiving, over the unsecure network by the zone player, a second message from the device, wherein the second message is generated responsive to receipt of the first message and wherein the second message includes a security parameter to be used by the zone player to join the secure network; and
   establishing a connection to the secure network by the zone player using the security parameter without further input by any user via either the zone player or the device.

16. The computer-readable medium of claim 15, wherein the security parameter is generated by the device.

17. The computer-readable medium of claim 15, wherein the security parameter comprises a wired equivalent privacy (WEP) key.

18. The computer-readable medium of claim 15, wherein the security parameter comprises a household identifier (HHID).

19. The computer-readable medium of claim 15, wherein the manual user action corresponds to a manual button press on the zone player.

20. The computer-readable medium of claim 15, wherein the device is triggered to hear the first message from the zone player.

21. The computer-readable medium of claim 15, further comprising receiving, over the unsecure network by the zone player, a request from the device to the zone player to respond with the zone player's current network configuration information.

22. The computer-readable medium of claim 21, further comprising transmitting, over the unsecure network by the zone player, a response to the device by the zone player including the zone player's network configuration information.

23. The computer-readable medium of claim 15, wherein the second message comprises a command message from the device to the zone player to reconfigure the zone player's network configuration information.

24. The computer-readable medium of claim 23, further comprising transmitting, by the zone player, a third message including a response indicating that the zone player's network configuration information has been changed according to the command message from the device.

25. A multimedia device for multimedia playback in a network, the device comprising:
- a memory to store data and instructions;
- a processor to execute the instructions in the memory; and
- a network interface to facilitate a data flow between a data network and the multimedia device,
- wherein the processor and the network interface are to facilitate:
  - receiving a manual user action, wherein the manual user action initiates an automatic establishment of a connection to the secure network by the multimedia device;
  - transmitting of a first message responsive to the manual user action over an unsecure network to be received by a second device configured for a secure network, wherein the first message indicates that the multimedia device is available to join the secure network;
  - receiving, over the unsecure network by the multimedia device, a second message from the second device, wherein the second message is generated responsive to receipt of the first message and wherein the second message includes a security parameter to be used by the multimedia device to join the secure network; and
  - establishing a connection to the secure network by the multimedia device using the security parameter without further input by any user via either the multimedia device or the second device.

26. The multimedia device of claim 25, further comprising an audio processing circuit to receive audio content over the secure network and to play back the audio content.

27. The multimedia device of claim 25, wherein the security parameter is generated by the second device.

28. The multimedia device of claim 25, wherein the security parameter comprises a wired equivalent privacy (WEP) key.

29. The multimedia device of claim 25, wherein the security parameter comprises a household identifier (HHID).

30. The multimedia device of claim 25, wherein the network interface comprises at least one of a wired network interface and a wireless network interface to communicate with the secure network.

31. The multimedia device of claim 25, wherein the manual user action corresponds to a manual button press on the multimedia device.

32. The multimedia device of claim 25, wherein the network interface is to transmit audio content to another multimedia device.

33. The multimedia of claim 25, wherein the network interface is to receive, over the unsecure network, a request from the second device to the multimedia device to respond with the multimedia device's current network configuration information.

34. The multimedia device of claim 33, wherein the network interface is to transmit, over the unsecure network, a response to the second device including the multimedia device's network configuration information.

35. The multimedia of claim 25, wherein the second message comprises a command message from the second device to the multimedia device to reconfigure the multimedia device's network configuration information.

36. The multimedia device of claim 35, wherein the network interface is to transmit a third message including a response indicating that the multimedia device's network configuration information has been changed according to the command message from the second device.

37. The multimedia device of claim 35, wherein the second device comprises at least one of a controller and a second multimedia device.

* * * * *

UNITED STATES PATENT AND TRADEMARK OFFICE
CERTIFICATE OF CORRECTION

| | | |
|---|---|---|
| PATENT NO. | : 8,326,951 B1 | Page 1 of 1 |
| APPLICATION NO. | : 11/147116 | |
| DATED | : December 4, 2012 | |
| INVENTOR(S) | : Millington et al. | |

It is certified that error appears in the above-identified patent and that said Letters Patent is hereby corrected as shown below:

On the Title Page    Item [60]
Please insert --Provisional Application No. 60/577,284, filed on June 5, 2004--

Signed and Sealed this
Ninth Day of July, 2013

Teresa Stanek Rea
*Acting Director of the United States Patent and Trademark Office*